428-408 SR
11/29/83 XR 4,418,118

United States Patent [19]

Lindors

[11] 4,418,118

[45] Nov. 29, 1983

[54] ELECTROLUMINESCENCE STRUCTURE

[75] Inventor: Sven G. Lindors, Espoo, Finland

[73] Assignee: Oy Lohja Ab, Virkkala, Finland

[21] Appl. No.: 366,573

[22] Filed: Apr. 8, 1982

[30] Foreign Application Priority Data

Apr. 22, 1981 [FI] Finland ................................ 811244

[51] Int. Cl.$^3$ ........................ H05B 33/14; B32B 17/06

[52] U.S. Cl. .................................... 428/336; 313/499; 313/503; 313/505; 313/506; 313/509; 313/510; 427/66; 428/323; 428/408; 428/432; 428/698; 428/699; 428/701; 428/917

[58] Field of Search ............... 428/917, 336, 701, 699, 428/698, 432, 408, 323; 427/66; 350/357; 313/503, 499, 510, 505, 506, 509

[56] References Cited

U.S. PATENT DOCUMENTS

| | | | |
|---|---|---|---|
| 2,824,992 | 2/1958 | Bouchard | 427/66 |
| 3,315,111 | 4/1967 | Jaffe et al. | 427/66 |
| 3,686,139 | 8/1972 | Lubin | 252/511 |
| 4,137,481 | 1/1979 | Hilsum | 313/503 |

FOREIGN PATENT DOCUMENTS

| | | | |
|---|---|---|---|
| 52-72197 | 6/1977 | Japan | 313/503 |
| 828720 | 2/1960 | United Kingdom | 427/66 |
| 1543233 | 3/1979 | United Kingdom . | |

*Primary Examiner*—Ellis P. Robinson
*Attorney, Agent, or Firm*—Fitzpatrick, Cella, Harper & Scinto

[57] ABSTRACT

In the present application, an electroluminescence structure is described which comprises, among other things, a first electrode layer (2) prepared by means of the thin film technique, and a second electrode layer (7, 7') prepared by means of a thick film technique, as well as a luminescence layer (4) disposed between the electrode layers. The use of a thick film directly as the electrode of a thin film structure causes problems resulting from inhomogeneous contact of the thick film material. According to the invention, these problems have been solved so that between the second electrode layer (7, 7') and the luminescence layer (4), a very thin additional layer (6) of resistive material is disposed which is bounded by the second electrode layer (7, 7') and which forms a spreading resistance for the point contacts of the conductive particles in the second electrode layer (7, 7'). In this resistance the inhomogeneous current density is homogenized before reaching the luminescence layer (4).

8 Claims, 1 Drawing Figure

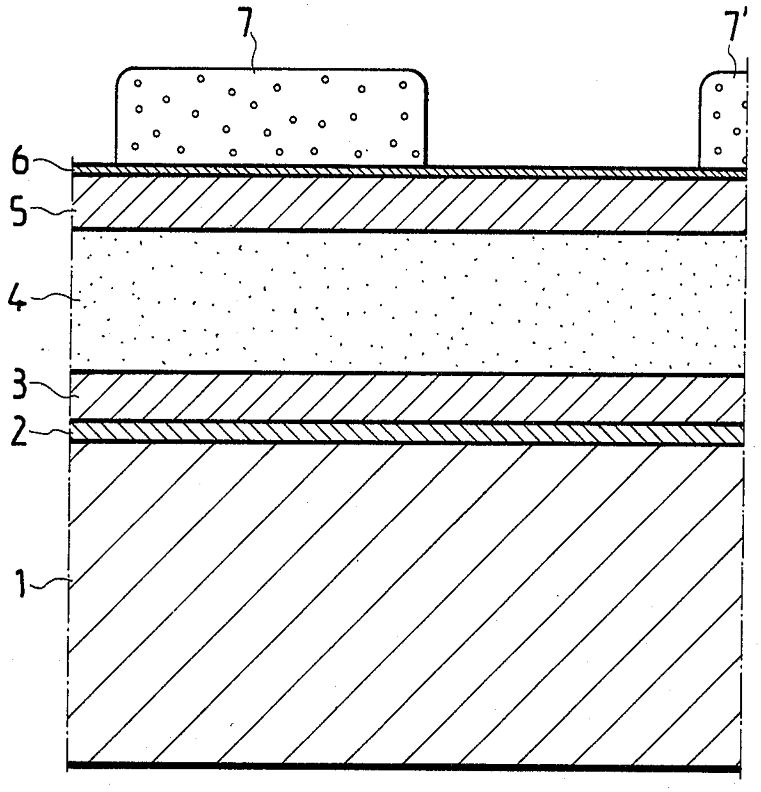
7
7'
6
5
4
3
2
1

ELECTROLUMINESCENCE STRUCTURE

The present invention concerns an electroluminescence structure, which comprises at least one substrate, e.g., of glass, at least one first electrode layer disposed on the substrate.

at least one second electrode layer arranged at a distance from the first electrode layer, a luminescence layer disposed between the first and the second electrode layer, and at least one additional layer disposed between an electrode layer and the luminescence layer and having the function of current limitation and/or chemical protection.

Electroluminescence structures known in the prior art, as a rule, comprise a substrate, e.g., of glass, as well as two electrode layers, one of which is disposed on the substrate. Between the electrode layers, there is a combination of a luminescence layer and of such additional layers, which function as current-limitation and/or chemical protection. When a voltage is applied between the electrode layers, the luminescence layer starts to emit light in those areas in which, the electrodes face each other. With the exception of the substrate, the layers are most appropriately prepared by means of the thin film technique.

Combinations of thin and thick films in themselves have been used in prior art in electroluminescence structures so that the operational functions (i.e., functions other than electrode functions) of the structure have been distributed between thin and thick films. Thus, in the U.S. Pat. No. 4,137,481 (Hilsum et al.), a structure is described in which the light is produced in the thin film and the current limitation, on the other hand, in the thick film.

Conversely, in the GB patent publication No. 1,300,548 (Vecht), a structure is suggested in which the light is produced in the thick film and the current limitation in the thin film.

However, direct use of the thick film as an electrode of the thin film structure causes problems resulting from the inhomogeneous contact of the thick film material. Attempts have been made to solve these problems, e.g., by means of the structure in accordance with the Finnish patent application 801318 (Lindfors et al), in which a black background is used. In that structure, however, in order to permit the use of a thick film electrode, an auxiliary thin film electrode formed by means of thin film lithography is needed.

The objective of the present invention is to replace the thin film lithography by a simpler and less expensive printing method and, at the same time, to obtain, other advantages with regard to the operational functions of the film.

The present invention is based on the idea that the function of the second electrode layer has been assigned to a layer prepared by means of the thick film technique and consisting of a binder and of conductive particles. This layer is bounded by a very thin layer of a resistive material which provides a spreading resistance for the point contacts of the conductive particles in the second electrode layer. In the resistance layer the inhomogeneous current density can be homogenized before reaching the luminescence layer.

Thus, it is noted that, without this thin resistive layer, it would not be possible to use a thick film material of the described type, containing particles, as second electrode layer because the point contact caused by the particles at the boundary surface would, owing to the inhomogeneous current density, cause an inhomogeneous luminescence in the luminescence layer.

More specifically, the electroluminescence structure in accordance with the invention is characterized in that the second electrode layer is a layer prepared by means of the thick film technique and consisting of a binder and of conductive particles, and between the second electrode layer and the luminescence layer there is a very thin layer of resistive material, bounded by the second electrode layer and forming a spreading resistance for the point contacts of the conductive particles in the second electrode layer, in which spreading resistance an inhomogeneous current density is homogenized before reaching the luminescence layer.

By means of the invention, remarkable advantages are achieved. Thus, the black layer functioning as the second electrode layer can be printed straight onto the chemical protective layer, whereby the transparent layer necessary in the prior art structures is omitted. Moreover, in accordance with the above, the awkward lithography step required in prior art technology is omitted.

The invention will be explained below in more detail with the air of the embodiment illustrated in the attached drawing.

The drawing is a partly schematical sectional view of one electroluminescence structure in accordance with the invention.

The structure in accordance with the drawing comprises a substrate 1, e.g., of glass, as well as a first electrode layer 2 disposed thereon. This electrode layer is made of indium-tin oxide ($I_xSn_yO_z$) by sputtering, and forms a thin film having a thickness of 40 to 50 nm. This layer can also be prepared by means of the ALE (Atomic Layer Epitaxy) method.

In an AC structure, an $Al_2O_3$ insulation layer 3 is deposited by means of the ALE method onto the first electrode layer 2, which insulation layer 3 functions as a current limiter and whose thickness is preferably 200 to 250 nm. Onto the insulation layer 3, the luminescence layer 4 proper (ZnS:Mn) is deposited, whose thickness is about 300 nm. Onto the luninescence layer 4, a second $Al_2O_3$ insulation layer 5 is deposited, by means of the ALE method, and is analogous with the insulation layer 3.

Onto the insulation layer 5, a layer 6 of a resistive material of a thickness of 10 to 100 nm, preferably about 50 nm, is deposited by means of the ALE method, said layer being made of $TiO_2$, $In_2O_3$, or $SnO_2$. Alternatively, this layer may be made of a very thin indium-tin oxide layer, whose thickness may be of the order of a few atom layers. The essential point is that the conductivity of this layer across its thickness is very high as compared with its conductivity in the lateral direction.

The thick film electrodes 7 and 7' forming the electroluminescence pattern proper are printed by means of the thick film technique onto the layer 6 of resistive material. Said electrodes consist of a binder and of conductive particles, preferably graphite particles. The thickness of these layers 7 and 7' is e.g., 40 to 50 $\mu$m. In this layer, which is made of a paste, known per se, the particles are situated at a certain distance from each other. Thereby, at the boundary surface between the layer 7 and the layer 6, a number of point contacts are produced through which the current can pass from the layers 7 and 7′ to the first electrode layer 2. The significance of the very thin layer 6 of resistive material resides exactly in that the current density, which is inhomogeneous owing to the point contact, can be homogenized during its passage through that layer 6 before reaching the insulation layer 5 and the luminescence layer 4. Since the distance between the thick film layers 7 and 7′ (e.g., 50 to 100 μm) is very wide as compared with the thickness of the resistive layer 6, practically no current will pass in the lateral direction through the resistive layer 6 from one thick film layer 7 to the adjacent thick film layer 7′. Thus, the thick film layer 7 containing conductive particles and the very thin resistive layer 6 bounded thereby will together fulfill the function of the second electrode layer efficiently.

At the boundary surface between the thick film layer 7 and the resistive layer 6, the distance between the particles producing point contact may vary within the range of 5 to 20 μm, which in itself means a very high unhomogeneity in the current density, but this current density can be fully homogenized while passing through the thin resistive layer 6. Thus, this layer 6 functions as a sort of spreading resistance. This means, e.g., that, by means of the invention, a series resistance suitable for current limitation in a DC electroluminescence structure has also been achieved.

In a DC structure, the spreading resistance produced at the point concatct can be used directly for obtaining current limitation. In the present case, the layer 3 is made, e.g., of $TiO_2$ (thickness about 100 nm), and the layer 5 of titanium-tantalum oxide (TTO, thickness about 200 to 500 nm).

Since the first electrode layer 2 may be continuous, all the layers 2 to 6 can be prepared as continuous layers by means of the ALE technique, whereas the luminescence patterning can be accomplished using the thick film technique exclusively by means of the layers 7.

As an additional alternative, it should be mentioned that the layer 6 of resistive material may also be made of a carbon film.

What is claimed is:

1. An electroluminescence structure including a substrate member, acid structure further comprising: a first electrode layer disposed on the substrate; a second electrode layer forming a thick film comprising a binder and conductive particles; and a luminescence layer and at least first and second additional layers disposed between the first and the second electrode layers; wherein said first additional layer is disposed between a said electrode layer and the luminescence layer and has at least one of the functions of current limitation and chemical protection; and wherein said second additional layer is formed of resistive material having a thickness of the order of about 10–100 nm, is disposed between the second electrode layer and the luminescence layer, and is bounded by the second electrode layer so as to form a spreading resistance for the point contacts formed by the conductive particles in the second electrode layer for homogenizing inhomogeneous current densities before the currents reach the luminescence layer.

2. An electroluminescence structure as claimed in claim 1, wherein the second electrode layer is made of a paste containing graphite particles.

3. An electroluminescence structure as claimed in claim 1, wherein the second additional layer of resistive material is made of $TiO_2$, $In_2O_3$, or $SnO_2$.

4. An electroluminescence structure as claimed in claim 3, wherein the thickness of the layer of resistive material is of the order of about 10 to 100 nm, preferably about 50 nm.

5. An electroluminescence structure as claimed in claim 1, wherein the second additional layer of resistive material is made of indium-tin oxide ($I_xSn_yO_z$).

6. An electroluminescence structure as claimed in claim 5, wherein the layer of resistive material has a thickness of a few atom layers.

7. An electroluminescence structure as claimed in claim 1, wherein the second additional layer of resistive material is made of a carbon film.

8. An electroluminescence structure as claimed in claim 1, wherein the second additional layer of resistive material is prepared by depositing by means of the ALE (Atomic Layer Epitaxy) method.

* * * * *

UNITED STATES PATENT AND TRADEMARK OFFICE

CERTIFICATE OF CORRECTION

PATENT NO. : 4,418,118

DATED : November 29, 1983

INVENTOR(S) : SVEN G. LINDFORS

It is certified that error appears in the above-identified patent and that said Letters Patent is hereby corrected as shown below:

Cover Page, item [75] Inventor: "Lindors" should be --Lindfors--.

Column 2, line 1, after "as" insert --the--;
line 27, change "air" to --aid--.

Column 3, line 29, change "concatct" to --Contact--.

Column 4, line 2, change "acid" to --said--.

Signed and Sealed this

*First* Day of *May 1984*

[SEAL]

*Attest:*

GERALD J. MOSSINGHOFF

*Attesting Officer* *Commissioner of Patents and Trademarks*